(12) United States Patent
Huang et al.

(10) Patent No.: US 10,574,713 B2
(45) Date of Patent: *Feb. 25, 2020

(54) SELF-ADAPTIVE SAMPLE PERIOD FOR CONTENT SHARING IN COMMUNICATION SESSIONS

(71) Applicant: Cisco Technology, Inc., San Jose, CA (US)

(72) Inventors: Haihua Huang, Jiangsu (CN); Yong Qian, Jiangsu (CN); Kejun Xia, Jiangsu (CN); Yaqing Zhang, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/366,007

(22) Filed: Dec. 1, 2016

(65) Prior Publication Data

US 2017/0085606 A1 Mar. 23, 2017

Related U.S. Application Data

(63) Continuation of application No. 13/955,073, filed on Jul. 31, 2013, now Pat. No. 9,549,006.

(51) Int. Cl.
*H04N 7/24* (2011.01)
*G06F 15/16* (2006.01)
(Continued)

(52) U.S. Cl.
CPC .......... *H04L 65/403* (2013.01); *G06F 3/1454* (2013.01); *G06Q 10/10* (2013.01); *H04L 65/4015* (2013.01); *H04N 7/15* (2013.01)

(58) Field of Classification Search
CPC .............................. H04L 65/403; G06F 3/1454
(Continued)

(56) References Cited

U.S. PATENT DOCUMENTS 4,843,564 A * 6/1989 Jenson ...................... G01P 5/26
340/606
8,081,205 B2 12/2011 Baird et al.
(Continued)

FOREIGN PATENT DOCUMENTS

CN 102457544 A 5/2012
CN 102883134 A 1/2013
(Continued)

OTHER PUBLICATIONS

International Search Report and Written Opinion in counterpart International Application No. PCT/US2014/047517, dated Jan. 8, 2015, 10 pages.
(Continued)

*Primary Examiner* — Kevin T Bates
*Assistant Examiner* — Golam Mahmud
(74) *Attorney, Agent, or Firm* — Edell, Shapiro & Finnan, LLC (57) ABSTRACT

According to one embodiment, a technique is presented to dynamically adjust a sample period used at a presenter device for a screen content capture sharing function during a communication session. In another embodiment, a technique is provided to control how frames of screen capture content, e.g., in a desktop sharing function, are sent to attendee devices during an online conference session. According to a still another embodiment, a technique is provided to enable on-demand designation of frames as key-frames during a desktop sharing function of an online conference session.

20 Claims, 10 Drawing Sheets (51) Int. Cl.
*H04L 29/06* (2006.01)
*G06F 3/14* (2006.01)
*H04N 7/15* (2006.01)
*G06Q 10/10* (2012.01)

(58) Field of Classification Search
USPC ........................................................ 709/204
See application file for complete search history.

(56) References Cited

U.S. PATENT DOCUMENTS

| | | | |
|---|---|---|---|
| 8,255,461 B1 | 8/2012 | Liu et al. | |
| 8,300,556 B2 | 10/2012 | Kalipatnapu et al. | |
| 8,413,054 B2 | 4/2013 | Kaplan et al. | |
| 8,924,862 B1* | 12/2014 | Luo | G06F 9/543 |
| | | | 715/753 |
| 2004/0080504 A1* | 4/2004 | Salesky | G06F 3/1415 |
| | | | 345/418 |
| 2007/0005752 A1* | 1/2007 | Chawla | H04L 12/1831 |
| | | | 709/224 |
| 2007/0271335 A1 | 11/2007 | Bostick | |
| 2008/0101466 A1* | 5/2008 | Swenson | H04N 21/2402 |
| | | | 375/240.07 |
| 2009/0292999 A1* | 11/2009 | LaBine | G06F 3/1454 |
| | | | 715/740 |
| 2011/0216153 A1* | 9/2011 | Tasker | H04N 7/147 |
| | | | 348/14.02 |
| 2012/0022815 A1* | 1/2012 | Murakami | G06Q 50/06 |
| | | | 702/62 |
| 2012/0154675 A1* | 6/2012 | Nasu | H04N 5/145 |
| | | | 348/452 |
| 2012/0317485 A1* | 12/2012 | Ding | G06F 3/1454 |
| | | | 715/719 |
| 2012/0317487 A1 | 12/2012 | Lieb et al. | |
| 2013/0007175 A1* | 1/2013 | Travis | H04M 3/42221 |
| | | | 709/206 |
| 2013/0093832 A1 | 4/2013 | Konda | |
| 2013/0124623 A1* | 5/2013 | Munter | H04L 65/403 |
| | | | 709/204 |
| 2013/0258042 A1* | 10/2013 | Shun | H04L 67/22 |
| | | | 348/14.08 |
| 2013/0297696 A1* | 11/2013 | Alexandrov | H04L 65/403 |
| | | | 709/204 |
| 2014/0032735 A1* | 1/2014 | Kapoor | G06F 3/1454 |
| | | | 709/224 |
| 2014/0098699 A1* | 4/2014 | Zhang | H04L 43/0835 |
| | | | 370/252 |
| 2015/0039688 A1 | 2/2015 | Huang et al. | |

FOREIGN PATENT DOCUMENTS

| | | |
|---|---|---|
| CN | 102934425 A | 2/2013 |
| WO | 2009129407 A1 | 10/2009 |

OTHER PUBLICATIONS

English translation of First Office Action in corresponding Chinese Application No. 201480043063.3, dated May 3, 2018, 7 pgs.

* cited by examiner

FIG.10

SELF-ADAPTIVE SAMPLE PERIOD FOR CONTENT SHARING IN COMMUNICATION SESSIONS

CROSS-REFERENCE TO RELATED APPLICATIONS

This application is a continuation of U.S. Non-Provisional application Ser. No. 13/955,073, filed on Jul. 31, 2013. The entire disclosure of the above application is incorporated herein by reference.

TECHNICAL FIELD

The present disclosure relates to online collaboration meeting systems.

BACKGROUND

In online meetings, meeting participants are able to share content, such as any content currently presented on their "desktop" to allow participants to view/listen to the desktop content, such as documents, video, etc. The desktop sharing function is a very useful collaboration application.

In the desktop-share process there is a presenter and one or more attendees. At the presenter, screen image capture is performed on a periodic basis. The captured content is then sent to one or more attendees. At the attendee, the content is displayed on a screen.

DESCRIPTION OF EXAMPLE EMBODIMENTS

Overview

According to one embodiment, a technique is presented herein to dynamically adjust a sample period used at a first device (also called a presenter device) for a desktop sharing function during an online conference session. At the presenter device, screen content is captured on a periodic basis according to a sample period. Frames of screen capture data are sent from the first device to a server that in turn processes the screen capture data and forwards it to the at least one second device (also called attendee device). The first device adjusts the sample period based on a first time interval measured from initiating a screen capture at the first device to completion of processing by the server of screen capture data received from the first device and a second time interval measured from sending of processed screen capture data to the second device to display of the processed screen capture data by the second device.

Example Embodiments

Figure 1:
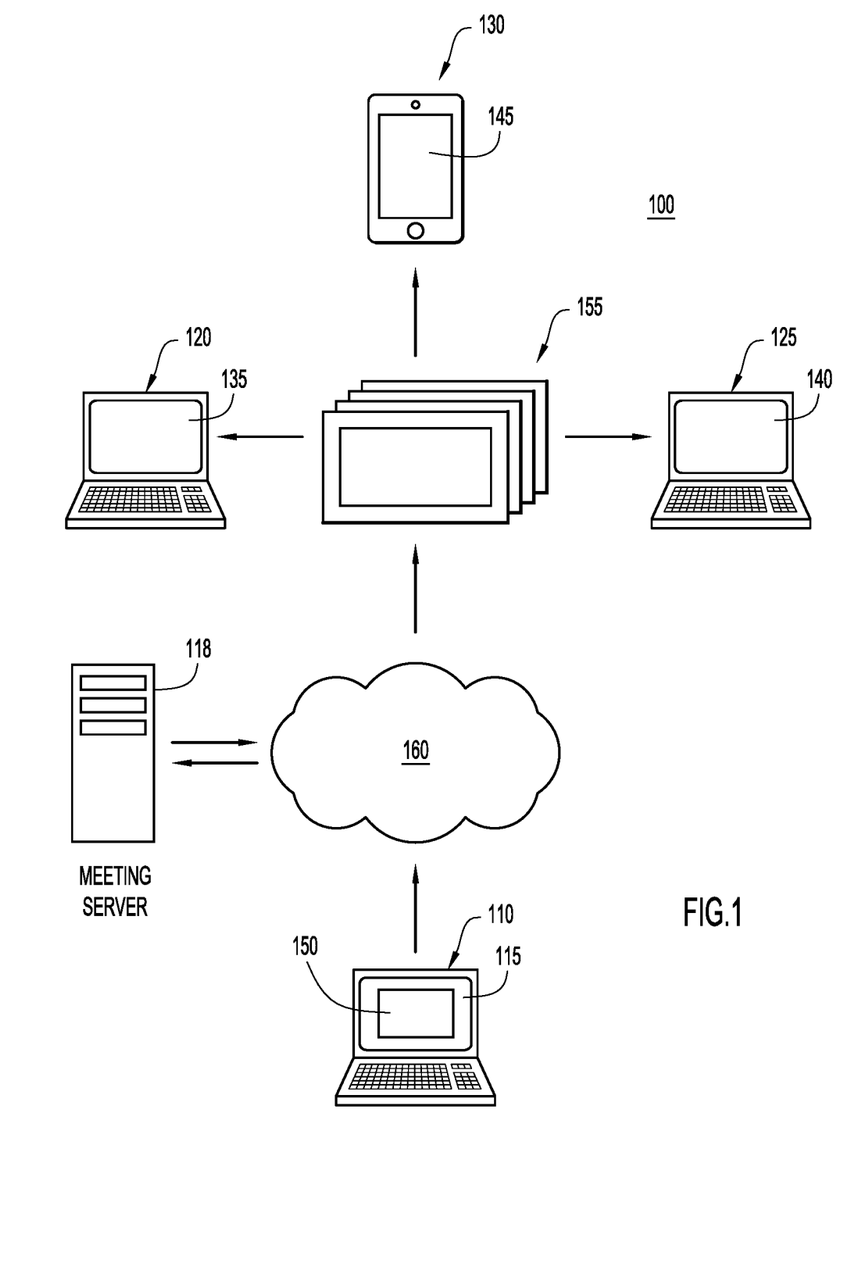
FIG. 1 is a block diagram of a conference system in which improvements presented herein for desktop sharing may be employed.

Presented herein are techniques for self-adaptive sample timing control for screen capture based sharing, e.g., desktop sharing, of content during an online meeting. Referring first to FIG. 1, a web-based or online meeting/conference system 100 is shown. The system 100 includes a plurality of user devices 110, 120, 125, 130 that communicate with the meeting server 118 and thus with each other, via the meeting server 118, over a network 160. The user devices may be in any number and may take a variety of forms, including a desktop computer, laptop computer, mobile/cellular phone (e.g., Smartphone), tablet computer, etc. The network 160 may consist of one or more wired and/or wireless local and/or wide area networks.

FIG. 1 shows that the user device 110 is a laptop computer, by way of example, though the user device 110 could take any of the device forms listed above. In the example shown in FIG. 1, the user device 110 is presenting content (that is also displayed on its display 115) to (i.e., sharing content with) participants/users and user devices 120, 125 and 130. Thus, user device 110 may also be referred to as a presenter device or first device. In FIG. 1, the presenter device 110 shares content 150 displayed on its display 115, with one or more of the user devices 120, 125 and 130. The user devices 120, 125 and 130 are also referred to herein as attendee devices (or second devices). To this end, the content 150 is transmitted across network 160 to the meeting server 118, which duplicates the shared content 150 and then transmits it to the devices 120, 125 and 130. The duplicated content is shown at reference numeral 155. Device 120 has a display 135, device 125 has a display 140 and device 130 has a display 145. The user devices 120, 125 and 130 display duplicated content 155 on their own displays 135, 140 and 145, respectively.

The content 150 which is shared may include presentation slides or pages of a document, as well as multimedia content, such as text, images, video, sounds, etc. The shared content 150 may include the entire "desktop" being displayed on display 115, or a portion thereof, or content displayed for an application or process or a video stream information from the presenter device 110. User devices 120, 125 and 130 may also alter the shared content 150 via their own displays 135, 140, 145, or presenter device 110 may have exclusive control over the shared content 150. User devices 120, 125, and 130 may also be able to return audio information or other multimedia content, which is then shared with other devices in the online meeting/conference system 100.

As explained above, when a device is sharing its desktop content with other devices during an online meeting, the presenter device captures the desktop content (through a screen capture operation) on a periodic basis with reference to a timer. The value of the timer (called a sample period) determines the sampling/screen capture rate of the screen content at the presenter device. If the timer value is too low, more network bandwidth is used in supplying desktop content to the meeting server, and pressure is imposed on the meeting server to process more data. The more direct impact is that desktop content previously received by the meeting server will not have been sent to the attendee devices before the next desktop content is received. If the attendee devices cannot respond very quickly, some frames will be ignored. Conversely, if the timer value is too large, attendees will notice abruptness in the desktop sharing experience.

The timer value (screen sample period) is often set based on experiment analysis, and in current systems, it is a fixed or static value that is never changed. There are disadvantages to using a static timer value for desktop sharing. First, attendee device circumstances change and are not the same across different types of devices, such as desktop computers, laptop computers, mobile devices, tablet computers, etc. In particular, different endpoint devices have different computational capabilities. One sampling/screen capture period for all devices and types of devices in an online meeting does not provide the best user experience.

Even if the sampling/screen capture period is set properly based on experimental analysis (during initial setup of the meeting), circumstances can change without control. For example, the network data rates can change frequently, the consequence of which can greatly affect user experience if an improper sampling period is used for a particular attendee device.

Accordingly, techniques for self-adaptive sample timing control are provided for screen capture based sharing, e.g., desktop sharing, of content during an online meeting. The sample period/sampling rate is computed dynamically in a desktop sharing process.

Figure 2:
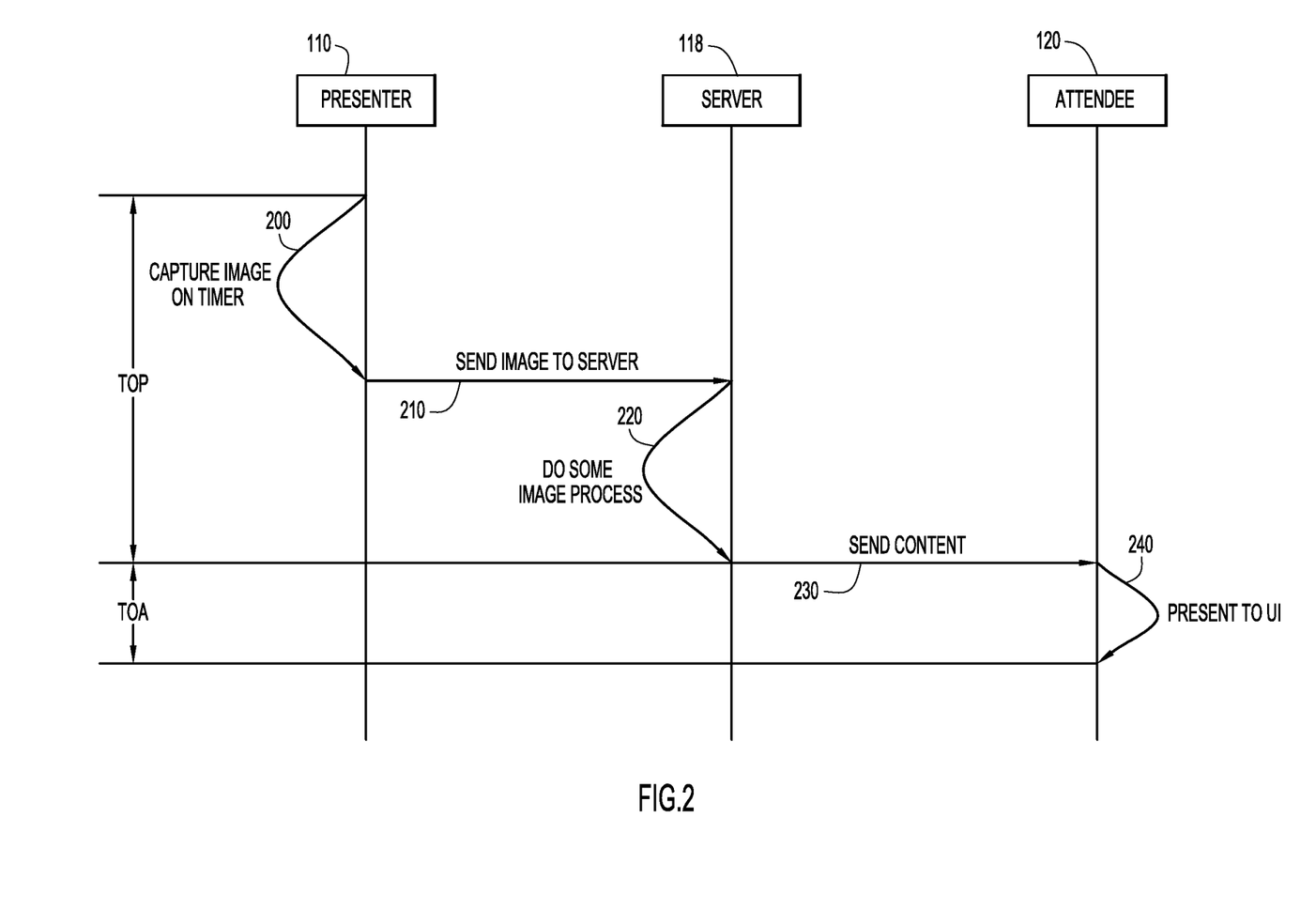
FIG. 2 is a diagram illustrating the timing associated with the capturing of screen content and transmission of the screen content from a presenter device to a server, and from the server to an attendee device.

Reference is now made to FIG. 2. FIG. 2 shows a diagram that depicts the timing propagation effects during a desktop sharing procedure. In the example of FIG. 2, the presenter device 110 is shown, along with the server 118 and the attendee device 120. At some point in time (based on the timer value, i.e., the sample period), an image is captured at the presenter device of a desktop of the presenter device, as shown at reference numeral 200. The image data is sent to the server 118 at 210. The server 118 performs some processing of the image data at 220, and sends the processed image data at 230 to the attendee device 120. At 240, the attendee device displays the image data in its user interface (UI). Time of Presenter (TOP) refers to the time period from the presenter device to the server actions completed. Similarly, Time of Attendee (TOA) refers to the time from when the server sends the processed image data to the time when it is displayed on the attendee device.

One Presenter, Multiple Attendees (with Server)

In the case of one presenter and multiple attendees, and a server to facilitate transfer of screen capture content from the presenter to the multiple attendees. At any given time, the TOP will have one value because the presenter and server parameters are generally fixed, but there are multiple TOA values because the time to send data to each individual attendee device depends on the particular network conditions with respect to each attendee device.

TOP Calculation Process

TOP and TOA are calculated dynamically. The presenter device, attendee devices and the server use "server-time" as a reference. First, the time-clock at all sides (presenter, server and attendee) are synchronized with respect to server-time. TOP and TOA are set to initial values based on experimental results. Next, a threshold condition is set for updating TOP. An average TOP is computed after it is determined several times, or a minimum period time is set for updating TOP or a new average TOP. When the presenter device begins to make a screen capture, the presenter device starts its determination of TOP. The TOP value is stored in an array at the presenter device. When the threshold condition is met, a new TOP value is calculated to update this value in the presenter device at the next sample period.

TOA Calculation Process

The TOA initial value (determined from experimentation) is set as the TOA, and then it is adjusted over time. The TOA should be an integer-multiple of TOP, or if not an integer multiple of TOP, then it is set to the nearest integer. The following examples are provided to demonstrate this.

a) TOP is 3. The TOA initial value is 4. An integer (e.g., 2) multiple of TOP (3) is 6 (2×3) which is not equal to 4. Therefore, the closest integer of TOP for TOA is 3, so TOA is adjusted to be 3.

b) TOP is 2. The TOA initial value is 3. An integer (e.g., 2) multiple of TOP is (2×2) which is 4. The difference from the initial value of TOA and 4 is 1. The larger value (4) is selected for TOA, because if the smaller value is selected, the attendee device will not be presented timely with the desktop content from the presenter device.

c) TOP is 5. Initial TOA value is 4. TOA is smaller than TOP. The TOA will be set to the same value as TOP, in the case, 5.

Calculate TOA Ratio

Every TOA adjusted-value is divided by TOP to produce a TOA ratio, e.g., (TOA/TOP). The TOA ratio is an integer.

Server Send Decision

The server maintains a counter. Every time TOP is updated, the counter is reset to 0. When a frame of desktop screen capture content arrives at the server from the presenter device, the server will increment the counter by 1 (one). Then, the server compares the counter value with the TOA ratio maintained for each attendee device participating in the meeting session with the presenter device. If the TOA ratio for an attendee device at the time a frame of screen capture content from the presenter device is received at the server is an integer multiple of the counter value, the desktop screen capture content at that sampling instant will be sent to that attendee.

Consider the following scenario with reference to FIG. 2. Assume a default sample timer is 1 s, that is, the presenter device make a screen capture of desktop content once every second. The presenter device actions (such as image capture) takes 0.5 s, server actions (such as image data processing) takes 2 s, and attendee device actions (receive screen capture data and present on user interface) takes 0.5 s. The entire process is 0.5+2+0.5=3 s.

In this example, the timer-value (sampling rate) will be adjusted from 1 s to 3 s because the sampling period should not be any shorter than the time period of the entire process, end-to-end. The process involves all devices (Presenter device, Server, Attendee devices) perform a synchronization using techniques such as those defined by the IEEE 1588 specification.

After transmission, the presenter device will calculate Presenter-Actions time-cost, the server will calculate Server-Actions time-cost, and Attendee device will calculate Attendee-Actions time-cost. These values can be exchanged between each of the devices or one end stores all of them, such as at the presenter device.

Specifically, TOP can be calculated:

TOP=Server time-cost+Presenter time-cost.

In every attendee device, when it finishes all actions and has rendered (i.e., displayed) the screen capture (desktop share) content to user, it records the attendee time-cost, and this could different for different attendee devices. The attendee specific TOA can be calculated as: TOA=attendee time-cost.

All of this information is sent from every attendee device to the server, where the server collects all attendees' time-cost results. This process may involve, first the presenter device sending data containing time-cost to the server, then the server sending data containing both presenter and server time-cost to the attendee device. Lastly, the attendee device sends data containing presenter/server/attendee time-cost data back to the presenter device. This can be optimized if the presenter device needs the data.

The timer value (sample period) for screen capture of desktop content=min(TOA+TOP), where min( ) is a minimum operation. It is understood that the sampling rate is the inverse of the sample period, i.e., screen capture sampling rate=1/(sample period). This value will be communicated from the server to the presenter device (or computed locally at the presenter device) and effective at the next screen capture for a desktop share. Simultaneously, all TOA values (for all of the attendee devices) are stored at the server.

When the next screen capture sample data is sent from the presenter device to the server, the server will decide whether the frame of screen capture data should be sent to each attendee based on the TOA value for each attendee device, as described below in connection with FIG. 4.

Figure 3:
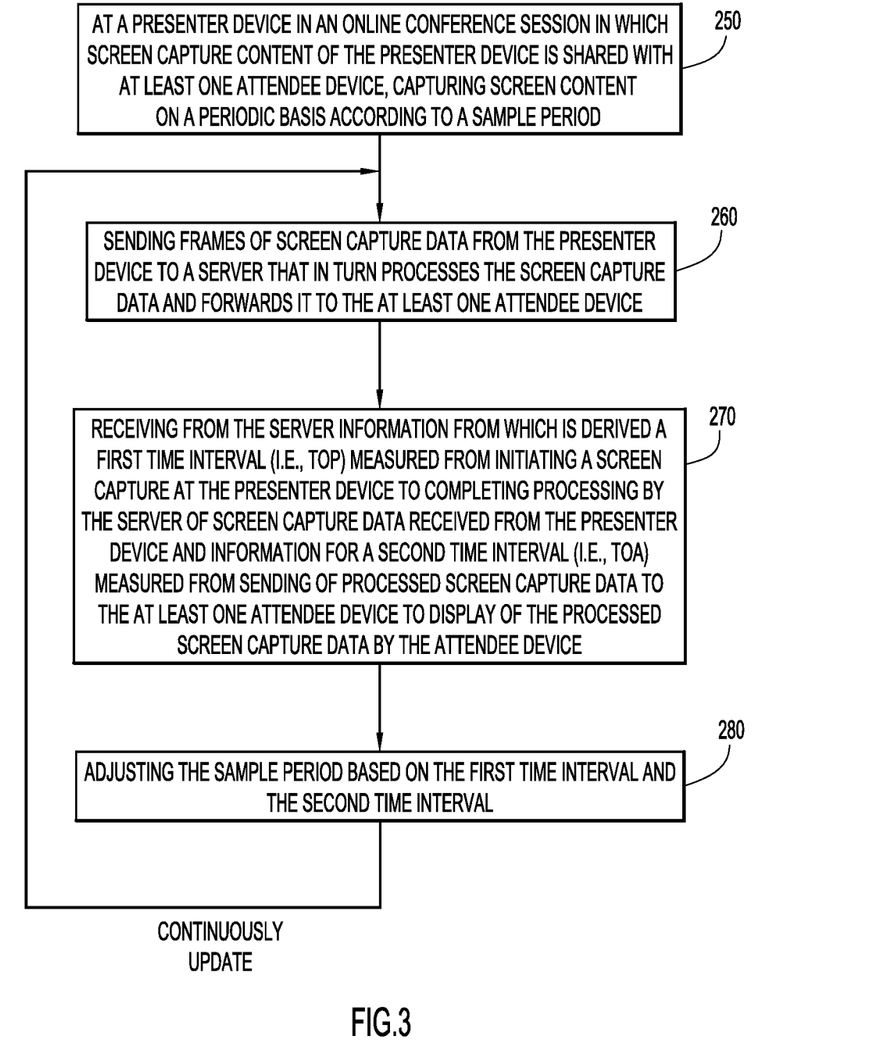
FIG. 3 is a flow chart depicting operations performed at a presenter device to adjust the sample period for use at the presenter device for desktop screen capturing.

Reference is now made to FIG. 3 for a description of a flow chart summarizing the operations performed at a presenter device (in an online conference session in which screen capture content of the presenter device is shared with at least one attendee device) to dynamically adjust the timer value (sample period) at which screen captures are made at the presenter device. At 250, the presenter device captures screen content on a periodic basis according to a sample period. At 260, the presenter device sends frames of screen capture data from the presenter device to a server that in turn processes the screen capture data and forwards it to the at least one attendee device. At 270, the presenter device receives from the server information from which is derived a first time interval (i.e., TOP) measured from initiating a screen capture at the presenter device to completion of processing by the server of screen capture data received from the presenter device, and information for a second time interval (i.e., TOA) measured from sending of processed screen capture data to the at least one attendee device to display of the processed screen capture data by the attendee device. At 280, the sample period is adjusted based on the first time interval and the second time interval, i.e., based on a minimum of a sum of the first time interval and the second time interval, as described above by the equation min(TOP+TOA).

Figure 4:
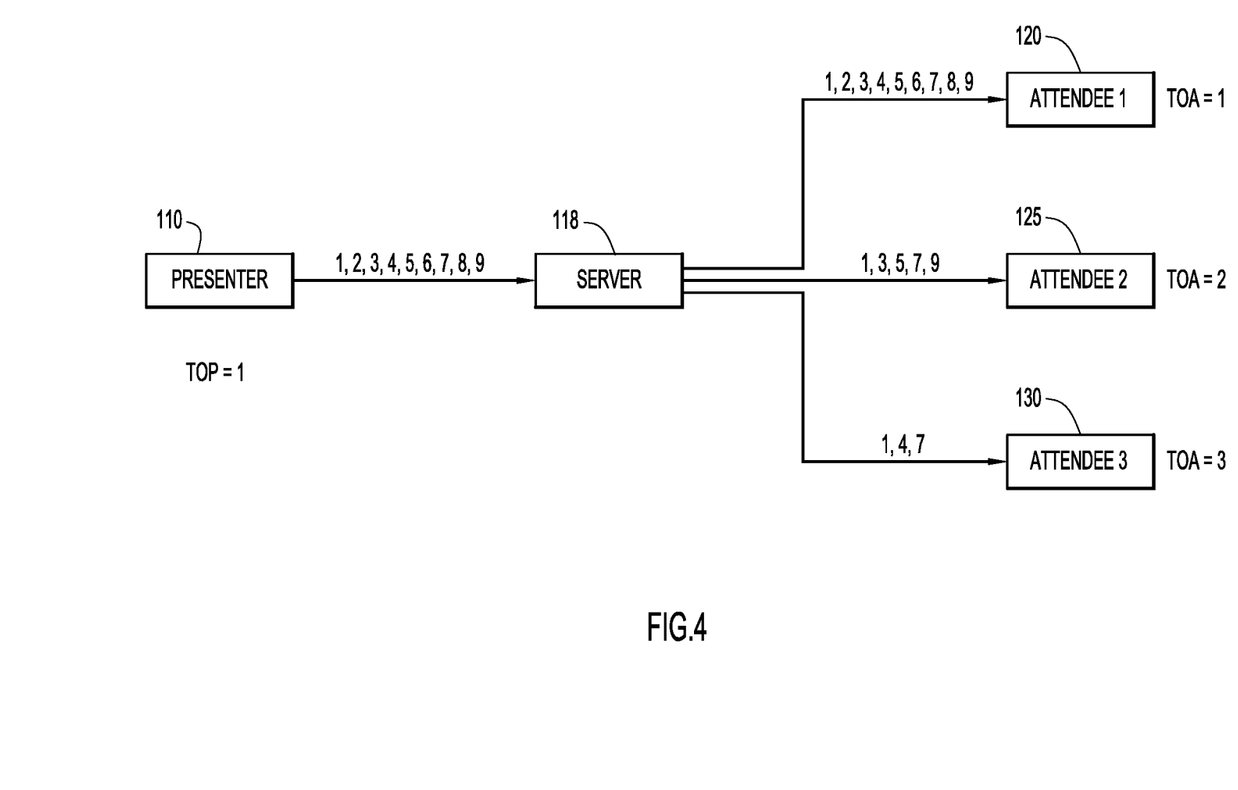
FIG. 4 is a diagram, similar to FIG. 2, and illustrating an example of server operations performed to dynamically control the sending of frames of screen capture data to attendee devices.

Reference is now made to an example shown in FIG. 4. In this example, TOP is 1. The presenter device sends frames 1-9 representing desktop screen capture content to server. The counter value at the server will be incremented by 1 when it receives each of the frames 1-9 from the presenter device. Different attendee devices receive different frames because the attendee devices 120, 125 and 130 have different TOAs and consequently different TOA ratios.

Specifically, attendee device 120 (attendee1) has a TOA of 1, attendee device 125 (attendee2) has a TOA of 2 and attendee device 130 (attendee3) has a TOA of 3. The server sends all of the frames 1-9 to attendee device 120 because the TOA ratio for attendee device 120 is 1 (TOA/TOP=1/1=1), and consequently the TOA ratio for attendee device 120 is an integer multiple of the counter value for each of frames 1-9.

Attendee device 125 has a TOA of 2. The TOA ratio for attendee device 125 is 2. As a result, the TOA ratio for attendee device 125 will be an integer multiple of the counter value for frame 1 (counter value 0), frame 3 (counter value 2), frame 5 (counter value 4), frame 7 (counter value 6) and frame 9 (counter value 8). Therefore, the server will send frames 1, 3, 5, 7 and 9 to attendee device 125.

Attendee device 130 has a TOA of 3, and thus a TOA ratio of 3 in this example. The TOA ratio for attendee device 125 will be an integer multiple of the counter value for frame 1 (counter value 0), frame 4 (counter value 3), and frame 7 (counter value 6). Therefore, the server will send frames 1, 4 and 7 to attendee device 125.

Figure 5:
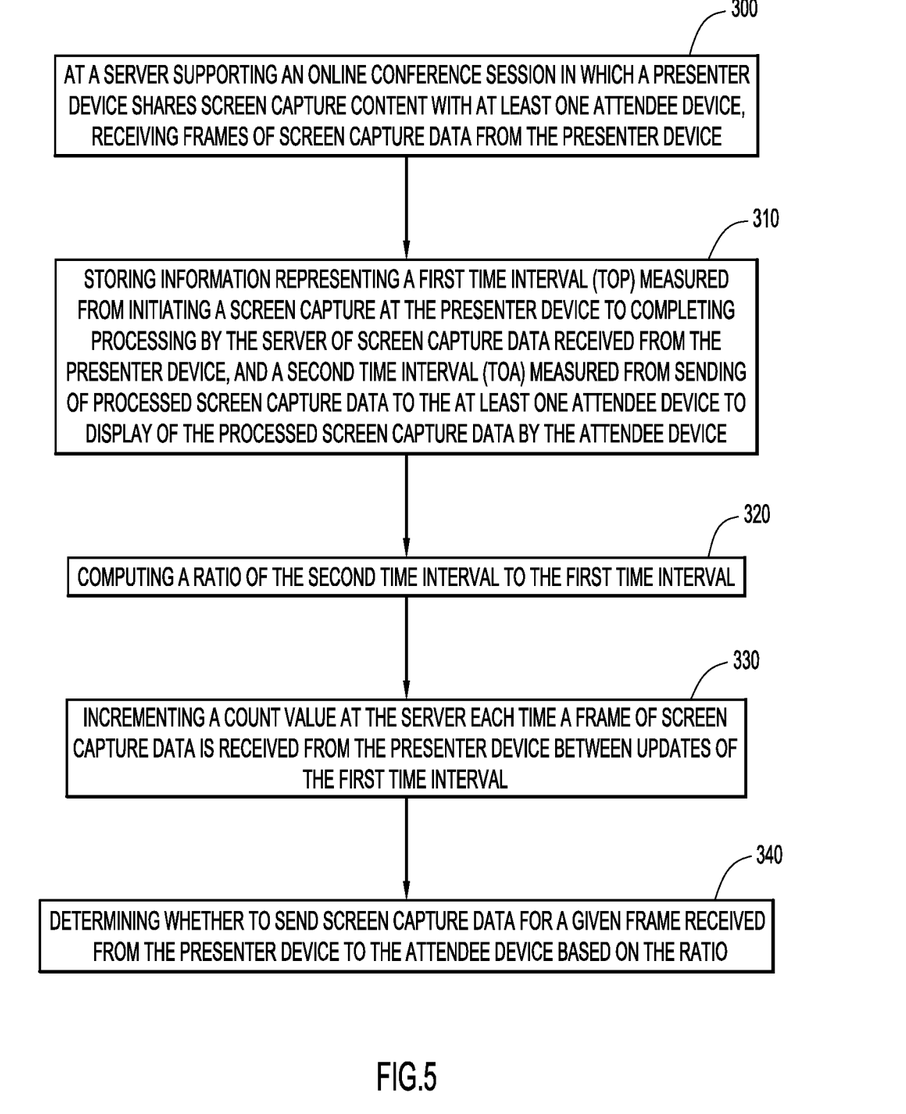
FIG. 5 is a flow chart depicting operations performed at a server in accordance with the techniques depicted in FIG. 4.

Reference is now made to FIG. 5 for description of a flow chart summarizing the techniques described above in connection with FIG. 4. At 300, at a server supporting an online conference session in which a presenter device shares screen capture content with at least one attendee device, frames of screen capture data are received from the presenter device. At 310, information is stored representing a first time interval (i.e., TOP) measured from initiating a screen capture at the presenter device to completing processing by the server of screen capture data received from the presenter device, and a second time interval (i.e., TOA) measured from sending of processed screen capture data to the at least one attendee device to display of the processed screen capture data by the attendee device. At 320, a ratio of the second time interval to the first time interval is computed (i.e., the TOA ratio). At 330, a count value is incremented at the server each time a frame of screen capture data is received from the presenter device between updates of the first time interval. At 340, a determination is made as to whether to send screen capture data for a given frame received from the presenter device to the attendee device based on the ratio. As described above, the determination at 340 involves determining to send screen capture data for a given frame when the ratio is an integer multiple of the count value.

When there are multiple attendee devices participating in an online conference session, at 310, the server stores the second time interval information (e.g., TOA) for each of the plurality of attendee devices participating in the online conference session. The ratio of the second time interval to the first time interval is computed for each of the plurality of attendee devices, at 320. The determination at 340 involves determining whether to send screen capture data for a given frame received from the presenter device to each of the plurality of attendee devices based on the ratio computed for each respective attendee device. For any given (particular) one of the plurality of attendee devices, it is determined to send screen capture data for a given frame when the ratio for the particular one of the plurality of attendee devices is an integer multiple of the count value.

One Presenter/One Attendee (with Server)

This case is a simplified process of the one described above in connection with FIG. 3 The steps are:
1) Calculate TOP.
2) Calculate TOA,
3) At presenter device, set its value as "TOP+TOA".
4) When receiving the desktop shared screen content from the presenter device, the server sends it directly to the attendee device.

One Presenter/One Attendee (without Server)

In this case, no server is involved. TOP and TOA are meaningless. The Time of Presenter to Attendee is computed (similar to TOP+TOA). The value will be set at the presenter device.

In summary, as explained above, if the presenter device determines that it does not need to send screen capture data to the server, then at that time, the presenter device will not perform a screen capture data. Likewise, at the server, if it determines that a particular attendee device cannot respond quickly enough (as reflected by its TOA ratio), then the server will not send screen capture data for a frame to that attendee device.

This is unlike traditional systems in which sample period used at the presenter device is static. If the transmission-time and process-time takes too long, this can cause longer latency, and waste of server memory resources to cache un-processed screen capture data. The latter can decrease server performance.

The actual network environment is varied. Even if a correct value is set for the sampling rate in experimental conditions and is mostly correct in most cases, unexpected situations can arrive in which the static sampling value is not useful. The consequence can be serious, causing severe performance degradation at the server.

Key-Frame Correction

Even with a dynamically adjusted sample period, sometimes some frames are ignored. To solve this problem, a "Key-frame" correction technique is provided. Specifically, a presenter at a presenting device can on-demand designate a current frame to be treated as a "Key-frame". As is known in the art, a Key-frame is a frame from data for other frames of data can be predicted. If the current frame is designated as a "Key-frame", that means that the frame will sent to all attendee devices regardless of the relationship between the TOA ratio and the current count value at the server. This on-demand "Key-frame" designation technique can be used independently of the techniques described above in connection with FIGS. 2-5 and with any desktop share implementation.

Figure 6:
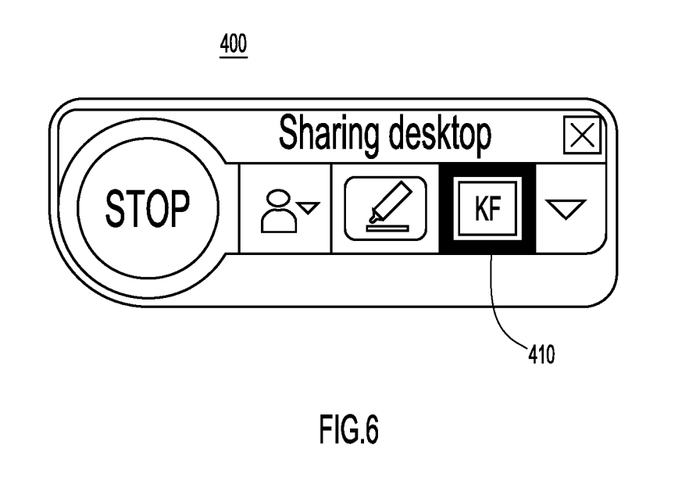
FIG. 6 is an example of a desktop share graphical user interface and depicting a button allocated for on-demand key-frame sending.

FIG. 6 shows an example desktop user interface 400 that includes a button 410 (labeled KF for Key-frame) specifically allocated to designate a current desktop screen capture frame as a Key-frame. A presenter may click on this button to cause the current screen capture frame to be treated as a Key-frame.

Figure 7:
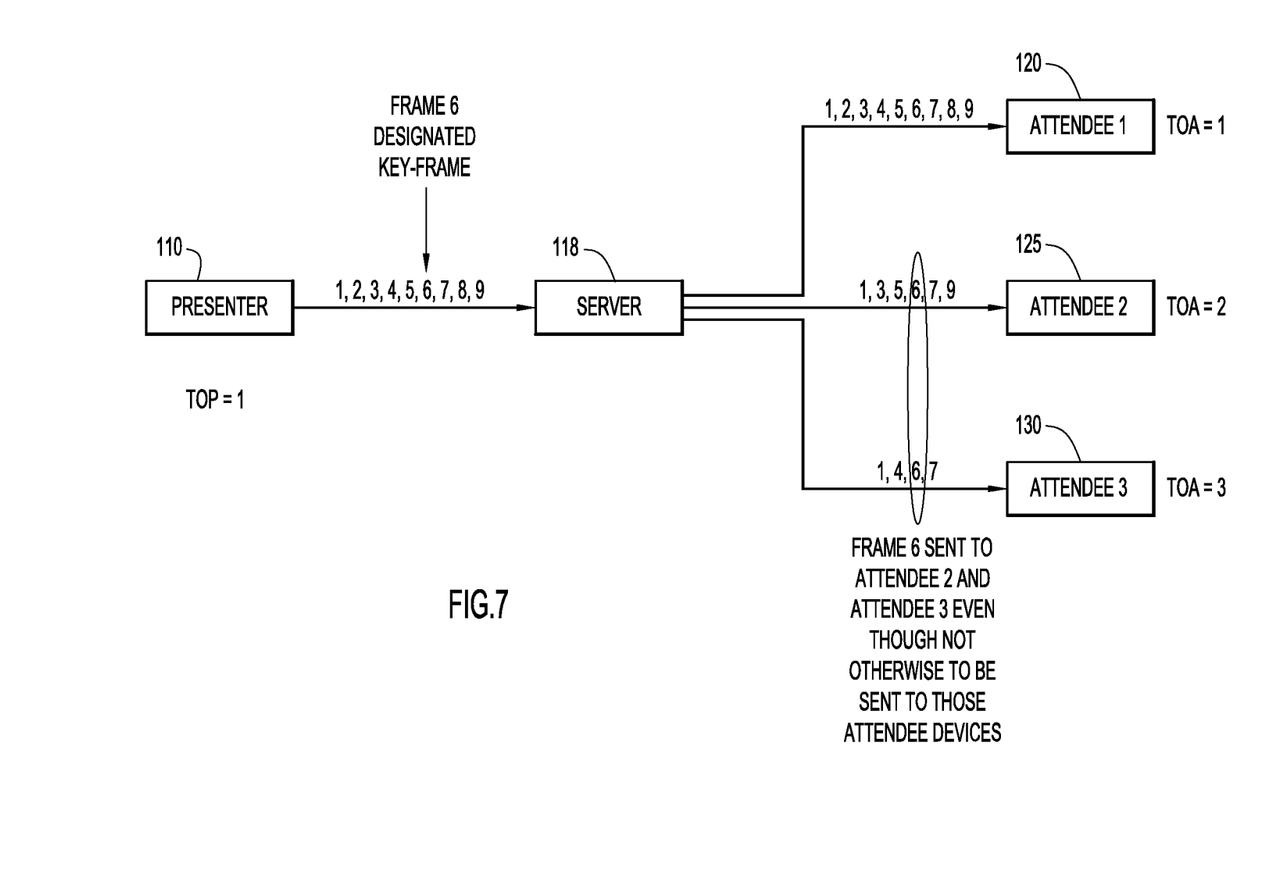
FIG. 7 is a diagram, similar to FIG. 2, and illustrating use of the on-demand key-frame function.

FIG. 7 illustrates a diagram similar to FIG. 4, but modified to indicate that frame 6 has been designated, by the presenter at the presenter device 110, as a Key-frame. The presenter at the presenter device 110 designates the current frame, when frame 6 occurs and is captured, as a Key-frame. The server 118 sends frame 6 to all attendee devices. Attendee1 was already going to receive frame 6, but attendee2 and attendee3 were not going to receive frame 6. However, since frame 6 was designated as a Key-frame, the server 118 sends frame 6 to attendee2 and attendee3 regardless of their TOA ratio comparison with the frame count value.

Figure 8:
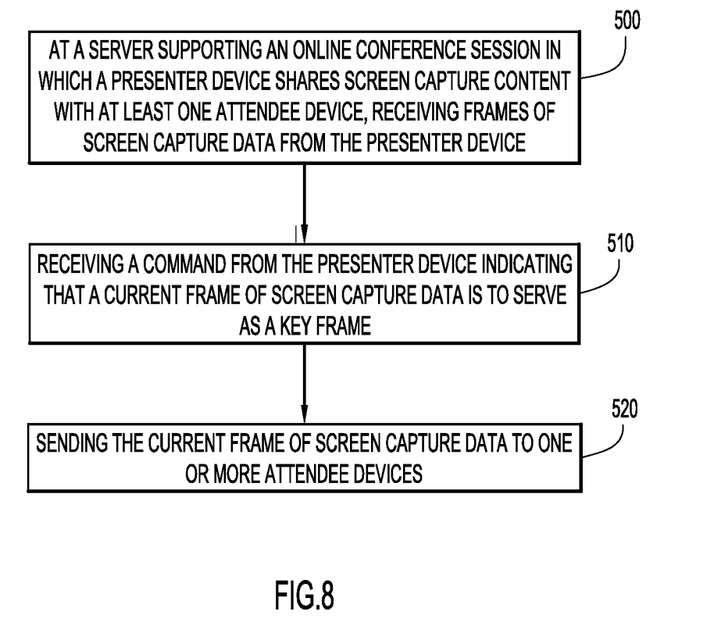
FIG. 8 is a flow chart depicting operations performed at a server for the on-demand key-frame function.

Turning now to FIG. 8, a flow chart is provided that depicts operations performed by the server to support the on-demand Key-frame feature described above in connection with FIGS. 6 and 7. At 500, at a server supporting an online conference session in which a presenter device shares screen capture content (e.g., desktop sharing) with at least one attendee device, frames of screen capture data are received from the presenter device. At 510, a command from the presenter device is received which indicates that a current frame of screen capture data is to serve as a Key-frame. At 520, the current frame of screen capture data (as a Key-frame) is sent to one or more attendee devices, and more specifically to all attendee devices participating in an online conference session.

Figure 9:
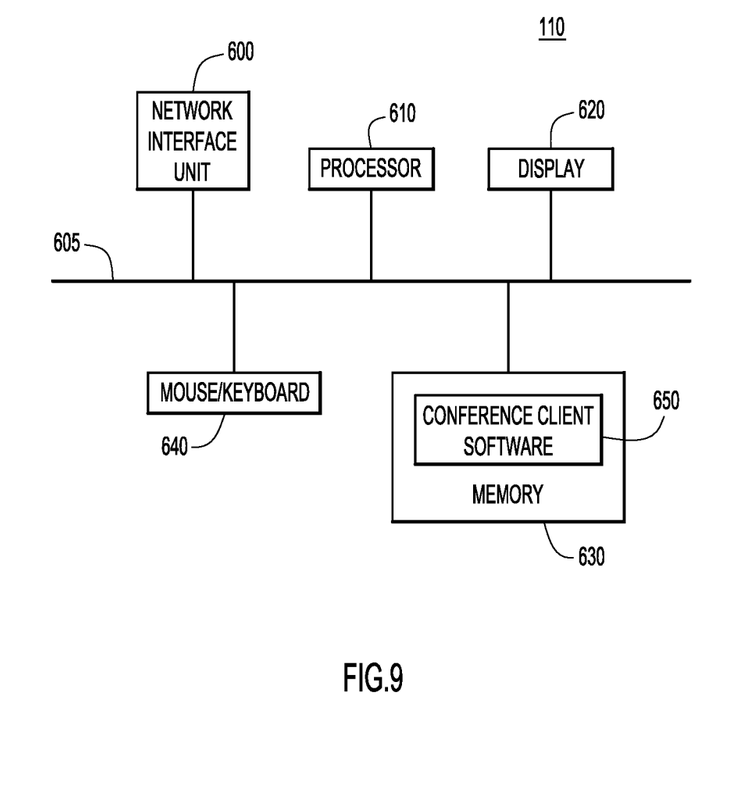
FIG. 9 is an example of a block diagram of a presenter device configured to perform the operations presented herein.

FIG. 9 illustrates an example of a block diagram of an endpoint device that may serve as a presenter device 110 in a conference session, and be configured to perform the techniques presented herein that are performed on a presenter device. The presenter device 110 includes a network interface unit 600, a bus 605, a processor 610, a display 620, memory 630, and user input devices such as mouse/keyboard 640. The network interface unit 600 is, for example, an Ethernet card that enables transmission and reception of data over a network. The bus 605 enables connectivity among the components of the presenter device 110. The processor 610 may be a microprocessor or microcontroller.

The memory 630 may comprise read only memory (ROM), random access memory (RAM), magnetic disk storage media devices, optical storage media devices, flash memory devices, electrical, optical, or other physical/tangible memory storage devices. In general, the memory 630 may comprise one or more tangible (non-transitory) computer readable storage media (e.g., a memory device) encoded with software, e.g., conference client software 650, comprising computer executable instructions and when the software is executed (by the processor 610) it is operable to perform the operations described herein at the presenter device 110.

Figure 10:
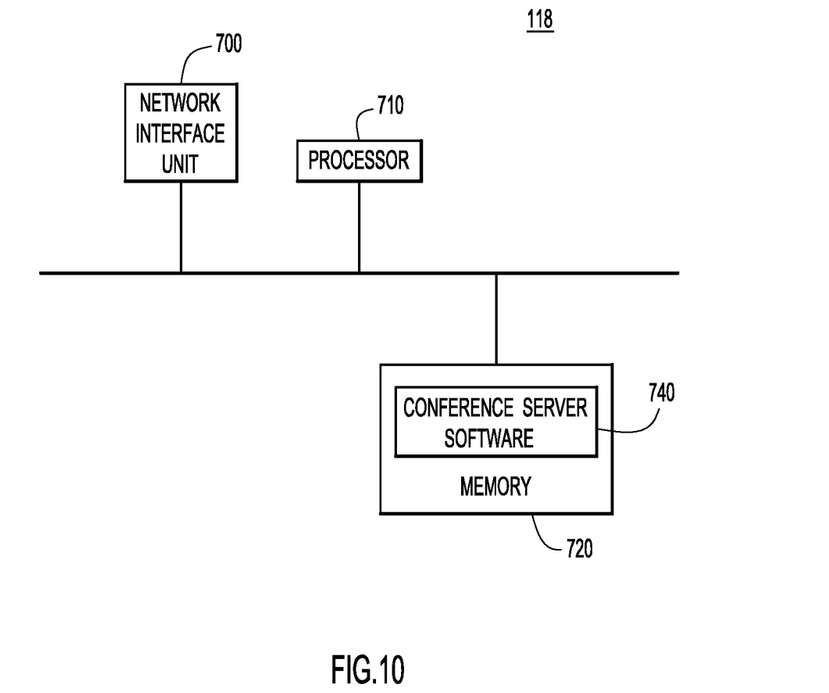
FIG. 10 is an example of a block diagram of a server configured to perform the operations presented herein.

FIG. 10 illustrates an example of a block diagram of a server 118 configured to perform the server side operations described herein. The server 118 includes a network interface unit 700, processor 710 and memory 720, and these components may take the form as described above in connection with FIG. 9. The memory 720 is encoded (stores) with conference server software 740 comprising computer executable instructions and when the software is executed (by the processor 710) it is operable to perform the operations described herein at the server 118.

In summary, presented herein are techniques for a self-adaptive sample period used in a desktop sharing function of a conference system. The sample period value is important to the desktop sharing process. The sample period value is dynamically set in different environments. This lets different attendees use his/her network more fully. In good network conditions, attendees will see smoother desktop sharing. In bad network conditions, screen capture frames will not be sent, avoiding unnecessary pressure at the server. Also presented herein is an on-demand "Key-frame" correction technique to overcome lost frames in the desktop sharing function.

The various techniques presented herein may be applicable in a desktop sharing scenario, as well as in any 1-1, 1-N real-time communication session, such as group telephone call where one person is the talker/presenter and the other(s) are participants. The role of who is presenting/talking and who is/are the participants, can be changed, and the techniques presented herein can be applied accordingly when a change occurs. Moreover, the various techniques presented above may be used in any combination. For example, the techniques depicted in FIGS. 2 and 3 may be combined with (used on top of) the techniques of FIGS. 4 and 5, and the techniques depicted in FIGS. 6-8 may be combined (used on top of) the techniques of either FIGS. 2 and 3 and/or the techniques for FIGS. 4 and 5.

To summarize, a method is provided comprising, at a first device (e.g., a presenter device) in a communication session in which screen capture content of the first device is shared with at least one second device, capturing screen content on a periodic basis according to a sample period; sending frames of screen capture data from the first device to a server that in turn processes the screen capture data and forwards it to the at least one second device; and adjusting the sample period based on a first time interval measured from initiating a screen capture at the first device to completion of processing by the server of screen capture data received from the first device and a second time interval measured from sending of processed screen capture data to the second device to display of the processed screen capture data by the second device.

In apparatus form, an apparatus is provided comprising a network interface unit configured to enable communications over a network to communicate with a server that supports a communication session in which screen capture content of a first device is shared with at least one second device; and a processor coupled to the network interface unit, wherein the processor is configured to: capture screen content on a periodic basis according to a sample period; send frames of screen capture data from the first device to a server that in turn processes the screen capture data and forwards it to the at least one second device; and adjust the sample period based on a first time interval measured from initiating a screen capture at the first device to completion of processing by the server of screen capture data received from the first device and a second time interval measured from sending of processed screen capture data to the second device to display of the processed screen capture data by the second device.

Further still, in computer readable storage media form, one or more tangible computer readable storage media are provided encoded with instructions that, when executed by a processor, cause the processor to: capture screen content on a periodic basis according to a sample period at a first device that is sharing content with at least one second device in a communication session; send frames of screen capture data from the first device to a server that in turn processes the screen capture data and forwards it to the at least one second device; and adjust the sample period based on a first time interval measured from initiating a screen capture at the presenter device to completion of processing by the server of screen capture data received from the first device and a second time interval measured from sending of processed screen capture data to the second device to display of the processed screen capture data by the second device.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   at a server supporting an online conference session in which a first device shares screen capture content with at least one second device:
      obtaining screen capture content from the first device to be shared with the at least one second device;
      processing the screen capture content to generate one or more frames of processed screen capture data for forwarding to the at least one second device;
      obtaining a first time interval representing a cumulative time period to complete a capture of a first frame of the one or more frames at the first device;
      obtaining a second time interval representing a cumulative time period to provide the first frame from the server to the at least one second device and to display the first frame of the processed screen capture data at the at least one second device; and
      determining whether to provide the first frame to the at least one second device based on whether a computed ratio of the second time interval to the first time interval is an integer multiple of a count value incremented each time a frame of the one or more frames is obtained from the first device between updates of the first time interval, wherein the computed ratio is the second time interval divided by the first time interval.

2. The method of claim 1, further comprising, at the server:
   computing a ratio of the second time interval to the first time interval to generate the computed ratio.

3. The method of claim 2, wherein the at least one second device includes a plurality of second devices, and wherein:
   obtaining the second time interval comprises storing the second time interval for each of the plurality of second devices;
   computing comprises computing the ratio of the second time interval to the first time interval for each of the plurality of second devices; and
   determining comprises determining whether to provide the processed screen capture data for the first frame to each of the plurality of second devices based on the computed ratio for each of the plurality of second devices.

4. The method of claim 3, wherein determining comprises:
   determining whether to provide the first frame to a particular one of the plurality of second devices when the computed ratio for the particular one of the plurality of second devices is the integer multiple of the count value.

5. The method of claim 1, further comprising:
   updating the first time interval based on a plurality of measurements of the first time interval made over time or on a predetermined periodic basis; and
   resetting the count value upon updating of the first time interval.

6. The method of claim 1, further comprising:
   setting the second time interval to be an integer multiple of the first time interval or a closest integer value of the first time interval.

7. The method of claim 1, further comprising:
   obtaining, from the first device, a command indicating that a current frame of the one or more frames is to serve as a key frame; and
   providing the current frame to the second device.

8. An apparatus comprising:
   a network interface unit configured to enable communications over a network to support an online conference session in which a first device shares screen capture content with at least one second device; and
   a processor coupled to the network interface unit, and configured to:
      obtain screen capture content from the first device to be shared with the at least one second device;
      process the screen capture content to generate one or more frames of processed screen capture data for forwarding to the at least one second device;
      obtain a first time interval representing a cumulative time period to complete a capture of a first frame of the one or more frames at the first device;
      obtain a second time interval representing a cumulative time period to provide the first frame from the apparatus to the at least one second device and to display the first frame of the processed screen capture data at the at least one second device; and determine whether to provide the first frame to the at least one second device based on whether a computed ratio of the second time interval to the first time interval is an integer multiple of a count value incremented each time a frame of the one or more frames is obtained from the first device between updates of the first time interval, wherein the computed ratio is the second time interval divided by the first time interval.

9. The apparatus of claim 8, wherein the processor is further configured to:
compute a ratio of the second time interval to the first time interval to generate the computed ratio.

10. The apparatus of claim 9, wherein the at least one second device includes a plurality of second devices, and wherein the processor is configured to:
store the second time interval for each of the plurality of second device;
compute the ratio of the second time interval to the first time interval for each of the plurality of second devices; and
determine whether to provide the processed screen capture data for the first frame to each of the plurality of second devices based on the computed ratio for each of the plurality of second devices.

11. The apparatus of claim 10, wherein the processor is configured to:
provide the first frame to a particular one of the plurality of second devices when the computed ratio for the particular one of the plurality of second devices is the integer multiple of the count value.

12. The apparatus of claim 8, wherein the processor is configured to:
update the first time interval based on a plurality of measurements of the first time interval made over time or on a predetermined periodic basis; and
reset the count value upon updating of the first time interval.

13. The apparatus of claim 8, wherein the processor is configured to:
obtain, from the first device, a command indicating that a current frame of the one or more frames is to serve as a key frame; and
provide the current frame to the second device.

14. One or more non-transitory computer readable storage media encoded with instructions that, when executed by a processor of a server that supports an online conference session in which a first device shares screen capture content with at least one second device, cause the processor to:
obtain screen capture content from the first device to be shared with the at least one second device;
process the screen capture content to generate one or more frames of processed screen capture data for forwarding to the at least one second device;
obtain a first time interval representing a cumulative time period to complete a capture of a first frame of the one or more frames at the first device;
obtain a second time interval representing a cumulative time period to provide the first frame from the server to the at least one second device and to display the first frame of the processed screen capture data at the at least one second device; and
determine whether to provide the first frame to the at least one second device based on whether a computed ratio of the second time interval to the first time interval is an integer multiple of a count value incremented each time a frame of the one or more frames is obtained from the first device between updates of the first time interval, wherein the computed ratio is the second time interval divided by the first time interval.

15. The one or more non-transitory computer readable storage media of claim 14, wherein the instructions are operable to:
compute a ratio of the second time interval to the first time interval to generate the computed ratio.

16. The one or more non-transitory computer readable storage media of claim 15, wherein the at least one second device includes a plurality of second devices, and wherein the instructions are operable to:
store the second time interval for each of the plurality of second devices;
compute the ratio of the second time interval to the first time interval for each of the plurality of second devices; and
determine whether to provide the processed screen capture data for the first frame to each of the plurality of second devices based on the computed ratio for each of the plurality of second devices.

17. The one or more non-transitory computer readable storage media of claim 16, wherein the instructions are operable to:
provide the first frame to a particular one of the plurality of second devices when the computed ratio for the particular one of the plurality of second devices is the integer multiple of the count value.

18. The one or more non-transitory computer readable storage media of claim 14, wherein the instructions are operable to:
update the first time interval based on a plurality of measurements of the first time interval made over time or on a predetermined periodic basis; and
reset the count value upon updating of the first time interval.

19. The one or more non-transitory computer readable storage media of claim 14, wherein the instructions are operable to:
set the second time interval to be an integer multiple of the first time interval or a closest integer value of the first time interval.

20. The one or more non-transitory computer readable storage media of claim 14, wherein the instructions are operable to:
obtain, from the first device, a command indicating that a current frame of the one or more frames is to serve as a key frame; and
provide the current frame to the second device.

* * * * *

UNITED STATES PATENT AND TRADEMARK OFFICE
CERTIFICATE OF CORRECTION

PATENT NO. : 10,574,713 B2
APPLICATION NO. : 15/366007
DATED : February 25, 2020
INVENTOR(S) : Haihua Huang et al.

Page 1 of 1

It is certified that error appears in the above-identified patent and that said Letters Patent is hereby corrected as shown below:

In the Claims

Claim 10, Column 11, Line 18, please replace "second device;" with --second devices;--

Signed and Sealed this
Fifth Day of May, 2020

Andrei Iancu
*Director of the United States Patent and Trademark Office*